(12) United States Patent
Pederson et al.

(10) Patent No.: US 7,606,727 B1
(45) Date of Patent: Oct. 20, 2009

(54) SYSTEM AND METHOD FOR IDENTIFYING OPTIMAL MARKETING OFFERS

(75) Inventors: Shane P. Pederson, Oak Park, IL (US); Lizhi Ma, Newark, DE (US); Hui Wang, Bear, DE (US); Tak Wing (Edward) Lau, Needham, MA (US)

(73) Assignee: JPMorgan Chase Bank, N.A., New York, NY (US)

( * ) Notice: Subject to any disclaimer, the term of this patent is extended or adjusted under 35 U.S.C. 154(b) by 1201 days.

(21) Appl. No.: 10/461,499

(22) Filed: Jun. 16, 2003

(51) Int. Cl.
*G06F 17/30* (2006.01)
(52) U.S. Cl. .................................................. 705/10
(58) Field of Classification Search .............. 705/10, 705/36, 7, 14; 708/131–132, 134; 434/107, 434/109, 433
See application file for complete search history.

(56) References Cited

U.S. PATENT DOCUMENTS

| | | | |
|---|---|---|---|
| 3,634,669 | A | 1/1972 | Soumas et al. |
| 3,946,206 | A | 3/1976 | Darjany |
| 4,047,033 | A | 9/1977 | Malmberg |
| 4,545,838 | A | 10/1985 | Minkus |
| 4,582,985 | A | 4/1986 | Lofberg |
| 4,594,663 | A | 6/1986 | Nagata et al. |
| 4,634,845 | A | 1/1987 | Riley |
| 4,642,768 | A | 2/1987 | Roberts |
| 4,700,055 | A | 10/1987 | Kashkashian |
| 4,750,119 | A | 6/1988 | Cohen |
| 4,766,293 | A | 8/1988 | Boston |
| 4,831,242 | A | 5/1989 | Englehardt |
| 4,882,675 | A | 11/1989 | Nichtberger |
| 4,897,533 | A | 1/1990 | Lyszczarz |
| 4,906,826 | A | 3/1990 | Spencer |
| 4,953,085 | A | 8/1990 | Atkins |
| 4,978,401 | A | 12/1990 | Bonomi |

(Continued)

FOREIGN PATENT DOCUMENTS

CA    2293321    12/1998

OTHER PUBLICATIONS

David L. Chandler's article Polling The methods behind the madness printed in The Boston Globe (Boston, MA) Nov. 2, 1992.*

(Continued)

*Primary Examiner*—Mary Cheung
*Assistant Examiner*—Brian Fertig
(74) *Attorney, Agent, or Firm*—Goodwin Procter LLP

(57) ABSTRACT

The present invention provides for a system and method for identifying optimal marketing offers in a mass marketing campaign. An optimal offer for a particular prospect at a particular time in the multi-wave campaign is determined. In accordance with one embodiment of the present invention, offer information is initially collected for each of the various offers tagged for potential inclusion into a. Each offer is analyzed to determine its eligibility for inclusion in a marketing campaign to a particular household or individual prospect within a household. A systematic evaluation of eligibility applies a plurality of predetermined criteria to each offer on a household level, a prospect level and an offer level. In this manner, offers failing such criteria may be easily removed from inclusion in the campaign. A net present value (NPV) and a net response rate may be calculated for each eligible offer to identify one or more optimal marketing offers.

32 Claims, 8 Drawing Sheets

U.S. PATENT DOCUMENTS

| | | | |
|---|---|---|---|
| 5,025,372 | A | 6/1991 | Burton |
| 5,080,748 | A | 1/1992 | Bonomi |
| 5,095,194 | A | 3/1992 | Barbanell |
| 5,117,355 | A | 5/1992 | McCarthy |
| 5,175,416 | A | 12/1992 | Mansvelt |
| 5,180,901 | A | 1/1993 | Hiramatsu |
| 5,192,947 | A | 3/1993 | Neustein |
| 5,202,826 | A | 4/1993 | McCarthy |
| 5,218,631 | A | 6/1993 | Katz |
| 5,276,311 | A | 1/1994 | Hennige |
| 5,287,268 | A | 2/1994 | McCarthy |
| 5,287,269 | A | 2/1994 | Dorrough |
| 5,297,026 | A | 3/1994 | Hoffman |
| 5,311,594 | A | 5/1994 | Penzias |
| 5,326,960 | A | 7/1994 | Tannenbaum |
| 5,339,239 | A | 8/1994 | Manabe et al. |
| 5,349,633 | A | 9/1994 | Katz |
| 5,350,906 | A | 9/1994 | Brody et al. |
| 5,365,575 | A | 11/1994 | Katz |
| 5,397,881 | A | 3/1995 | Mannik |
| 5,424,524 | A | 6/1995 | Ruppert |
| 5,450,477 | A | 9/1995 | Amarant |
| 5,459,306 | A | 10/1995 | Stein |
| 5,465,206 | A | 11/1995 | Hilt |
| 5,466,919 | A | 11/1995 | Hovakimian |
| 5,471,669 | A | 11/1995 | Lidman |
| 5,477,038 | A | 12/1995 | Levine |
| 5,479,494 | A | 12/1995 | Clitherow |
| 5,482,139 | A | 1/1996 | Rivalto |
| 5,483,444 | A | 1/1996 | Heintzman |
| 5,500,514 | A | 3/1996 | Veeneman |
| 5,511,114 | A | 4/1996 | Stimson |
| 5,521,363 | A | 5/1996 | Tannenbaum |
| 5,530,232 | A | 6/1996 | Taylor |
| 5,530,235 | A | 6/1996 | Stekfik |
| 5,537,314 | A | 7/1996 | Kanter |
| 5,544,086 | A | 8/1996 | Davis |
| 5,544,246 | A | 8/1996 | Mandelbaum |
| 5,553,120 | A | 9/1996 | Katz |
| 5,578,808 | A | 11/1996 | Taylor |
| 5,585,787 | A | 12/1996 | Wallerstein |
| 5,637,845 | A | 6/1997 | Kolls |
| 5,644,727 | A | 7/1997 | Atkins |
| 5,689,650 | A | 11/1997 | McClelland |
| 5,703,344 | A | 12/1997 | Bezy |
| 5,710,886 | A | 1/1998 | Christensen |
| 5,721,768 | A | 2/1998 | Stimson |
| 5,729,693 | A | 3/1998 | Holda-Fleck |
| 5,745,706 | A | 4/1998 | Wolfberg et al. |
| 5,765,141 | A | 6/1998 | Spector |
| 5,774,870 | A | 6/1998 | Storey |
| 5,777,305 | A | 7/1998 | Smith |
| 5,787,156 | A | 7/1998 | Katz |
| 5,787,404 | A | 7/1998 | Fernndez-Holmann |
| 5,806,042 | A | 9/1998 | Kelly |
| 5,835,576 | A | 11/1998 | Katz |
| 5,852,811 | A | 12/1998 | Atkins |
| 5,857,079 | A | 1/1999 | Claus |
| 5,857,709 | A | 1/1999 | Chock |
| 5,864,828 | A | 1/1999 | Atkins |
| 5,864,830 | A | 1/1999 | Armetta |
| 5,870,718 | A | 2/1999 | Spector |
| 5,875,437 | A | 2/1999 | Atkins |
| 5,884,285 | A | 3/1999 | Atkins |
| 5,911,135 | A | 6/1999 | Atkins |
| 5,911,136 | A | 6/1999 | Atkins |
| 5,915,243 | A * | 6/1999 | Smolen ........................ 705/14 |
| 5,926,800 | A | 7/1999 | Baronowski |
| 5,955,961 | A | 9/1999 | Wallerstein |
| 5,970,480 | A | 10/1999 | Kalina |
| 5,974,399 | A | 10/1999 | Giuliani et al. |
| 5,991,750 | A | 11/1999 | Watson |
| 6,000,608 | A | 12/1999 | Dorf |
| 6,000,832 | A | 12/1999 | Franklin et al. |
| 6,009,415 | A | 12/1999 | Shurling et al. |
| 6,016,954 | A | 1/2000 | Abe et al. |
| 6,032,136 | A | 2/2000 | Brake, Jr. et al. |
| 6,036,099 | A | 3/2000 | Leighton |
| 6,038,552 | A | 3/2000 | Fleischl et al. |
| 6,070,153 | A | 5/2000 | Simpson |
| 6,105,865 | A | 8/2000 | Hardesty |
| 6,128,598 | A | 10/2000 | Walker et al. |
| 6,128,599 | A | 10/2000 | Walker et al. |
| 6,164,533 | A | 12/2000 | Barton |
| 6,189,787 | B1 | 2/2001 | Dorf |
| 6,227,447 | B1 | 5/2001 | Campisano |
| 6,236,977 | B1 * | 5/2001 | Verba et al. ................... 705/10 |
| 6,243,688 | B1 | 6/2001 | Kalina |
| 6,341,724 | B2 | 1/2002 | Campisano |
| 6,345,261 | B1 | 2/2002 | Feidelson et al. |
| 6,615,189 | B1 | 9/2003 | Phillips et al. |
| 6,925,441 | B1 * | 8/2005 | Jones et al. ................... 705/10 |
| 6,970,830 | B1 * | 11/2005 | Samra et al. .................. 705/10 |
| 2002/0095365 | A1 | 7/2002 | Slavin |
| 2003/0154129 | A1 * | 8/2003 | Goff ............................ 705/14 |
| 2003/0187717 | A1 * | 10/2003 | Crites et al. ................... 705/10 |
| 2003/0187767 | A1 * | 10/2003 | Crites et al. ................... 705/35 |
| 2004/0039679 | A1 * | 2/2004 | Norton et al. ................. 705/37 |
| 2004/0044615 | A1 * | 3/2004 | Xue et al. ..................... 705/38 |
| 2004/0093296 | A1 * | 5/2004 | Phelan et al. ................. 705/36 |
| 2004/0128194 | A1 * | 7/2004 | Mase et al. ................... 705/14 |

OTHER PUBLICATIONS

Welcome to Card Express, The CardEx Incentive Card, as disclosed in the CardEx web site archived by web.archive.org on Feb. 7, 1998 [http://web.archive.org/web/*/http://www.cardex.com], retrieve Oct. 18, 2003, 8 pages.

Welcome to Card Express, CardEx web site archived by web.archive.org on Oct. 31, 1996 [http://web.archive.org/web/*/http://www.cardex.com], retrieve Oct. 18, 2003, 7 pages.

CardEx Incentives, Apr. 6, 1999, www.cardexco.com, 15 pages.

"Associates First Capital Corporation", Hoover's Inc., The Industry Standard: The Newsmagazine of the Internet Economy, thestandard.net/companies/cpmpany-display, Apr. 6, 1999, 2 pages.

Jeffrey M. Lacker, "Stored Value Cards: Costly Private Substitutions for Government Currency", Economic Quarterly, 1996, 17 pages.

"The Evolution of a New Consumerism", Chain Store Age, vol. 73, pp. 8-9, Jun. 1997, 4 pages.

Lisa Fickenscher, "Amex prepaid offering is latest card for firms regarding employees", American Banker, vol. 161, No. 151, Aug. 8, 1996, 2 pages.

"Welcome to Swiftgift", Swiftgift, www.swiftgiftcard.com, Dec. 8, 1998, 10 pages.

Lucy Lzarony, "Stuck for a gift? Give a prepaid credit card", www.bankrate.com, Dec. 21, 1998, 2 pages.

Antoinette Coulton, "Incentives field moving to card-based series 14", American Banker, Mar. 26, 1998, 3 pages.

Credit Card News, "A store card issuer looks for lift from electronic gift certificates", Feb. 1, 1995, 2 pages.

Business Travel News, "Maritz gets mastercard's stamp of approval", Aug. 19, 1996, 2 pages.

Debit Card News, vol. 2, Issue 2, "Boatman's floats stored value into the employee incentive waters", Jul. 16, 1996, 3 pages.

Mickey Meece, "Boatman's prepaid cards for worker-incentive firm", American Banker, Jul. 2, 1996, 1 page.

Card News, vol. 6, No. 25, "D.C. Area Safeway stores look for increase in sales volume and revenue with cards", Dec. 1991, 3 pages.

Spurgin, "Sopininmon! or What's happening in the retail credit card environment", Credit World Journal, Apr. 1997, 7 pages.

AT&T Marketing, "Universal card free lifetime membership extended 3 months", www.att.com/press/0297/970217.csa.html, Dec. 4, 1990 2 pages.

Chain Store Age Executive with Shopping Center Age, "More retailers turn to co-branding", Feb. 1, 1995, 3 pages.

Introducing SpendingMoney(TM), Armetta: Marketing & Design Product Concept Report, Oct. 9, 1996, 15 pages.

First USA Platinum Connect, First USA Bank, First USA Promotional Mailing, Oct. 1997, 6 pages.

Introducing the First USA Platinum Connect Card, First USA Promotional Mailing, Dec. 1997, 6 pages.

Here's the calling convenience you asked for: 1-800-call-AT&T . . . For All Calls, Appendix A: For Card Carriers, 7 pages.

Beth Piskora, Debit Cards Seen Poised for New Markets, American Banker, pp. 16, Mar. 7, 1995, 1 page.

Nick Rosen, Cash Just Isn't Flexible Enough: Shops of the Future Will Only Take Cards, Daily Express: Technology Section, Feb. 10, 1995, 1 page.

Phil Britt, Competing in Auto Lending, America's Community Banker, vol. 5, No. 11, pp. 33-37, Nov. 1, 1996, 7 pages.

Miriam Krenin Souccar, Smart Cards: 1st Union Smart Card Pilot Enlists a Second Army Base, American Banker, 3 pages.

First Union Issues Smart Cards to Fort Benning Recruits, CardFax, 1 page.

Emerson Brown and Jim Baum, Purchasing Card Magic: Eli Lilly Finds Accounts Payable Flying High With Plastic, Corporate Cashflow, 4 pages.

Christine Dugas, Payroll May Ask: Paper or Plastic?, USA Today, 3B, Aug. 14, 2001, 1 page.

Cards International Jan. 30, 1996, First Data markets stored-value cards, 2 pages.

Business Wire, Jan. 15, 1996, CES/NaBANCO introduces stored value card technology; blockbuster video is first merchant partner, 2 pages.

Melinda Norris, et al., Omaha World Herald, Jan. 19, 1996, Sunrise Edition, First data unit develops blockbuster cash card, 2 pages.

Valerie Block, The American Banker, Sep. 1, 1995, Blockbuster running test of a stored value card, 2 pages.

Sora Song, A card that asks for ID, Monday, Apr. 12, 2004, Time Magazine, 1 page.

Rachel Konrad, Associated Press, IBM had a bunch of unusual ideas in 2003, printed from Philly.com on Jan. 21, 2004, posted on Tues., Jan. 13, 2004, 2 pages.

Incentive firms debit cards a rewarding experience (Off-line debit card issuers converage efforts with companies looking for effective incentives to boost employee productivity and to motivate individuals to buy their products), Debit Card News, vol. 3, No. 11, Nov. 28, 1997, (Author unknown), 3 pages.

News Release, For Release: Monday, Feb. 17, 1997, New 1-800-CALL-ATT campaign promotes one number for all calls, 2 pages.

S. P. Miller et al., Section E.2.1: Kerberos Authentication and Authorization System, Project Athena, Cambridge, Massachusetts, Dec. 21, 1987, 39 pages.

Swift Gift 'Wows' Internet Shoppers, Wed., Dec. 2, 1998, PR Newswire, 2 pages (Author Unknown).

* cited by examiner

US 7,606,727 B1

SYSTEM AND METHOD FOR IDENTIFYING OPTIMAL MARKETING OFFERS

FIELD OF THE INVENTION

The present invention relates generally to the management of marketing offers and, more particularly, to system and method for identifying optimal marketing offers.

NOTICE OF COPYRIGHTED MATERIAL IN DISCLOSURE

A portion of the disclosure of this patent document contains material that is subject to copyright protection. The copyright owner of this material has no objection to the facsimile reproduction by anyone of the patent document or the patent disclosure, as it appears in the U.S. Patent and Trademark Office patent file or records, but otherwise reserves all copyright rights whatsoever.

BACKGROUND OF THE INVENTION

As with many other businesses, those within the financial services industry have endeavored to identity and focus their marketing practices as efficiently as possible so as to maximize their return on investment. Unfortunately, existing financial institution marketing practices have heretofore failed to sufficiently identify marketing opportunities with a significant likelihood of success. Rather, typical financial services marketing campaigns revolve primarily upon indiscriminate mass mailings, premised on the hope that a statistical percentage of receiving prospects may be open to the offers included within the mailing, failing to take any additional factors into account, such as same or similar offer proximity, time degradation, etc.

Accordingly, there is a need in the art of financial services marketing for a system and method for identifying an optimal product to offer a prospect at the individual level. In addition, there is a need for an optimal marketing offer determination system incorporating time degradation of financial characteristics, and to introduce prospect-level, household-level, and offer-level constraints.

BRIEF SUMMARY OF THE INVENTION

The present invention overcomes or mitigates the problems noted above, and provides additional advantages, by providing a system and method for analyzing potential offers in a mass mailing marketing campaign, and to determine optimal offer(s) for mailing to a particular prospect at a particular time in a multi-wave campaign. In accordance with one embodiment of the present invention, offer information is initially collected for each of the various offers tagged for potential inclusion into a marketing campaign. Once the offer information has been collected, each offer is analyzed to determine whether it is eligible for inclusion in a mailing to a particular household or individual prospect within a household. In particular, when analyzing each mailing of the campaign, the suitability for mailing to each prospect and household is determined in a systematic manner, based upon a plurality of predetermined eligibility criteria. In this manner, offers failing such criteria can be easily removed from inclusion in the mailing.

Once an offer is determined to be eligible for inclusion in a mailing, an estimated net present value (NPV) for the offer given a predetermined degradation factor may be determined. NPV may be calculated based on 36 months of discounted net cash flows. NPV is intended to measure the overall profitability of an offer in a pre-specified period of time. Other essential financial figures may be derived along with NPV, such as CPA (average cost per acquisition), payback period (time to break even), loss estimates (NCL) in each of year 1, 2 and 3, and yearly return on outstanding. Additionally, a net response rate (NRR) for the offer may be determined. Next, a listing of offers in order of either estimated NPV or NRR is output to enable selection of the best offer combination to be included in a particular mailing to a particular prospect.

The system and method of the present invention is designed to take the output from a prospect-level profit and loss application and determine the optimal marketing offer(s) to make to each prospect in a target population. Optimization can be based on any pre-specified criteria that can be calculated at the prospect level. The system incorporates prospect-level, household-level, and offer-level constraints and can be applied in a multi-wave marketing campaign to determine the optimal offer(s) to make at each point in time. Additionally, the present invention computes time-degradation factors for financial inputs that go into the optimality decision.

The system of the present invention incorporates input degradation across time, by dynamically updating the input parameter sets. Consequently, the system and method of the present invention result in increased efficiency in acquisitions campaigns, that is, fewer mail pieces are needed to acquire the same number of customer responses or new accounts as in the past. Similarly, the present invention also improves overall net present value by mailing offers that generate higher revenues.

To achieve these advantages and in accordance with the purpose of the invention, as embodied and broadly described herein, a method for identifying optimal marketing offers comprises: collecting and analyzing information associated with a plurality of potential marketing offers; identifying a plurality of marketing offers, from the plurality of potential marketing offers, that are eligible for inclusion in a mailing campaign, based on a plurality of predetermined criteria and the collected information, where the plurality of potential marketing offers are evaluated for eligibility on a household level, a prospect level and an offer level; calculating a measure of profitability or response rate for each of the identified eligible marketing offers; and identifying at least one optimal marketing offer from the eligible marketing offers based at least in part on the measure of profitability or response rate for each of the eligible marketing offers.

In a further aspect, a computer readable medium having code for causing a processor to identify optimal marketing offers comprises: code adapted to collect and analyze information associated with a plurality of potential marketing offers; code adapted to identify a plurality of marketing offers, from the plurality of potential marketing offers, that are eligible for inclusion in a mailing campaign, based on a plurality of predetermined criteria and the collected information, where the plurality of potential marketing offers are evaluated for eligibility on a household level, a prospect level and an offer level; code adapted to calculate a measure of profitability or response rate for each of the identified eligible marketing offers; and code adapted to identify at least one optimal marketing offer from the eligible marketing offers based at least in part on the measure of profitability or response rate for each of the eligible marketing offers.

In another aspect, a system for identifying optimal marketing offers comprises: a data analysis module for collecting and analyzing information associated with a plurality of potential marketing offers; an identification module for identifying a plurality of marketing offers, from the plurality of potential marketing offers, that are eligible for inclusion in a mailing campaign, based on a plurality of predetermined criteria and the collected information, where the plurality of potential marketing offers are evaluated for eligibility on a household level, a prospect level and an offer level; a calculation module for calculating a measure of profitability or response rate for each of the identified eligible marketing offers; and an optimization module for identifying at least one optimal marketing offer from the eligible marketing offers based at least in part on the measure of profitability or response rate for each of the eligible marketing offers.

In yet another aspect, a system for identifying optimal marketing offers comprises: means for collecting and analyzing information associated with a plurality of potential marketing offers; means for identifying a plurality of marketing offers, from the plurality of potential marketing offers, that are eligible for inclusion in a mailing campaign, based on a plurality of predetermined criteria and the collected information, where the plurality of potential marketing offers are evaluated for eligibility on a household level, a prospect level and an offer level; means for calculating a measure of profitability or response rate for each of the identified eligible marketing offers; and means for identifying at least one optimal marketing offer from the eligible marketing offers based at least in part on the measure of profitability or response rate for each of the eligible marketing offers.

It is to be understood that both the foregoing general description and the following detailed description are exemplary and explanatory and are intended to provide further explanation of the invention as claimed.

BRIEF DESCRIPTION OF THE DRAWINGS

The present invention can be understood more completely through the following detailed description of the invention, in conjunction with the accompanying drawings.

DETAILED DESCRIPTION OF THE INVENTION

Figure 1:
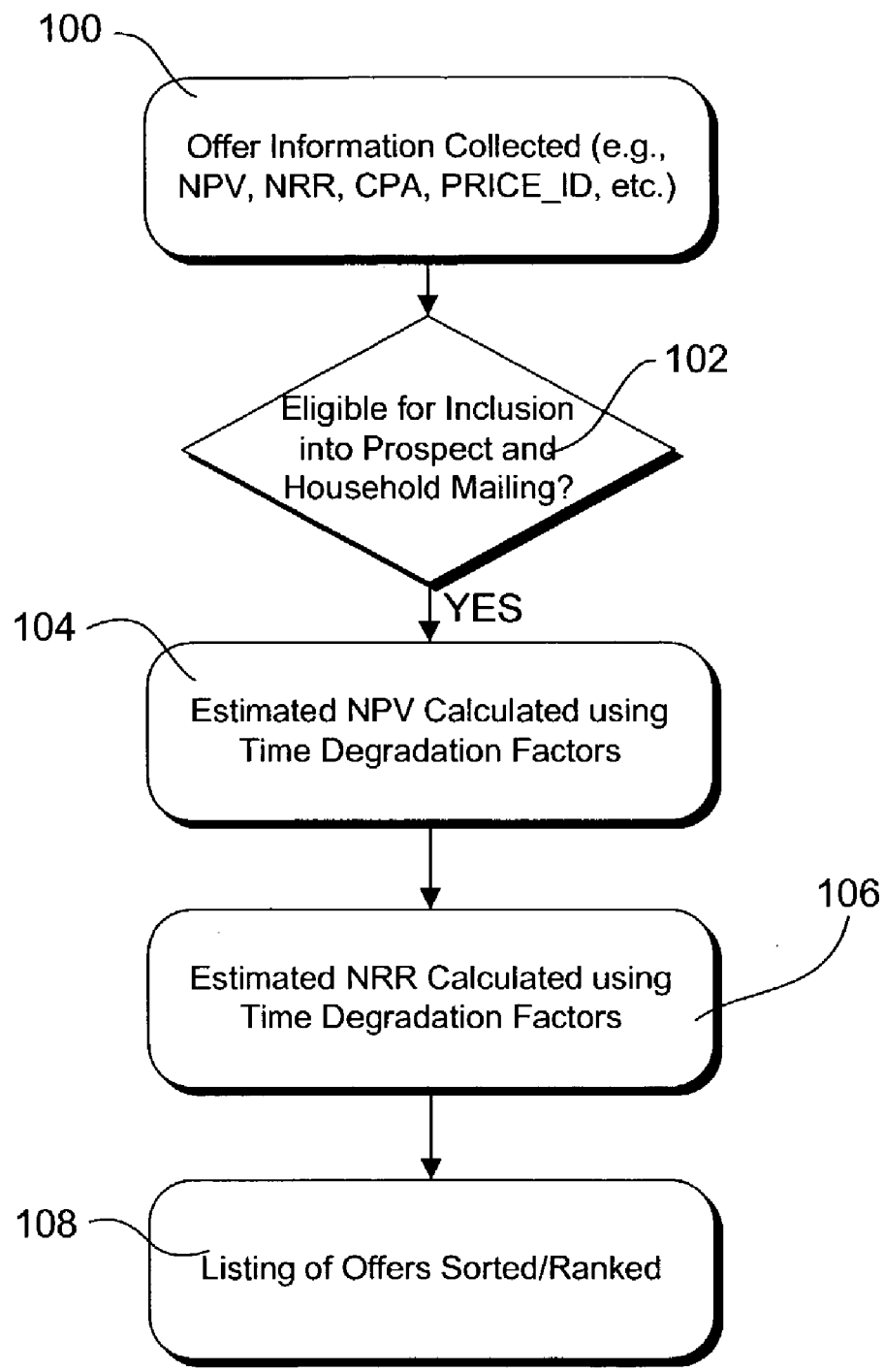
FIG. 1 is a flow diagram illustrating a method for identifying optimal marketing offers in accordance with one embodiment of the present invention.

Referring to the figures and, more particularly, to FIG. 1, there is shown a flow diagram illustrating a high-level method for identifying optimal marketing offers in accordance with one embodiment of the present invention. Initially, at step 100, offer information may be collected for each of the various offers tagged for potential inclusion into a marketing campaign. Examples of offer information may include such elements as its new NPV (net present value, financial gain from offer), NRR (net response rate to the offer), CPA (average cost per acquisition), NS_NAME (name of the association representing a given offer, including brand and partners), NS_ID (numerical identification for NS_NAME), PRICE_ID (numerical identification to look up price point information of a given offer), PAYBACK_MONTH (number of months to break even for an offer), Y3NCL (expected loss rate percentage in the third year once an account is booked), and Y3ROO (expected return on outstanding in the third year once an account is booked). It should be understood that additional types of suitable offer-related information may also be collected and applied to the method of the present invention.

Once the offer information has been collected, each offer may be analyzed at step 102 to determine whether it is eligible for inclusion in a mailing to a particular household or individual prospect within a household. In particular, when analyzing each mailing of the campaign, the suitability for mailing to each prospect and household may be determined in a systematic manner, based upon predetermined eligibility criteria. In this manner, offers failing such criteria may be easily removed from inclusion in the mailing being analyzed, thereby saving unnecessary costs. Additional specifics regarding the eligibility determination mechanism will be set forth in detail below. Once an offer is determined to be eligible for inclusion in a mailing, the estimated NPV for the offer given a predetermined degradation factor may be calculated at step 104. Additionally, the net response rate for the offer may be calculated at step 106. Additional details regarding NPV and NRR calculation will also be set forth below. Next, at step 108, a listing of offers in order of either estimated NPV or NRR may be output to enable selection of the best offer combination to be included in a given mailing.

The extract of computer code in Table 1 exemplifies the above-described collection and set-up of offer parameter information and has been written in the SAS Version 8 computer language. It should be understood that the techniques applied herein are merely exemplary and may be embodied in different manners utilizing any desired computer programming language (e.g., Visual Basic, C++, etc.). Comments included within the code (demarcated by each pair of /* */ characters) are provided to assist in the interpretation and understanding of the programming.

Figure 2:
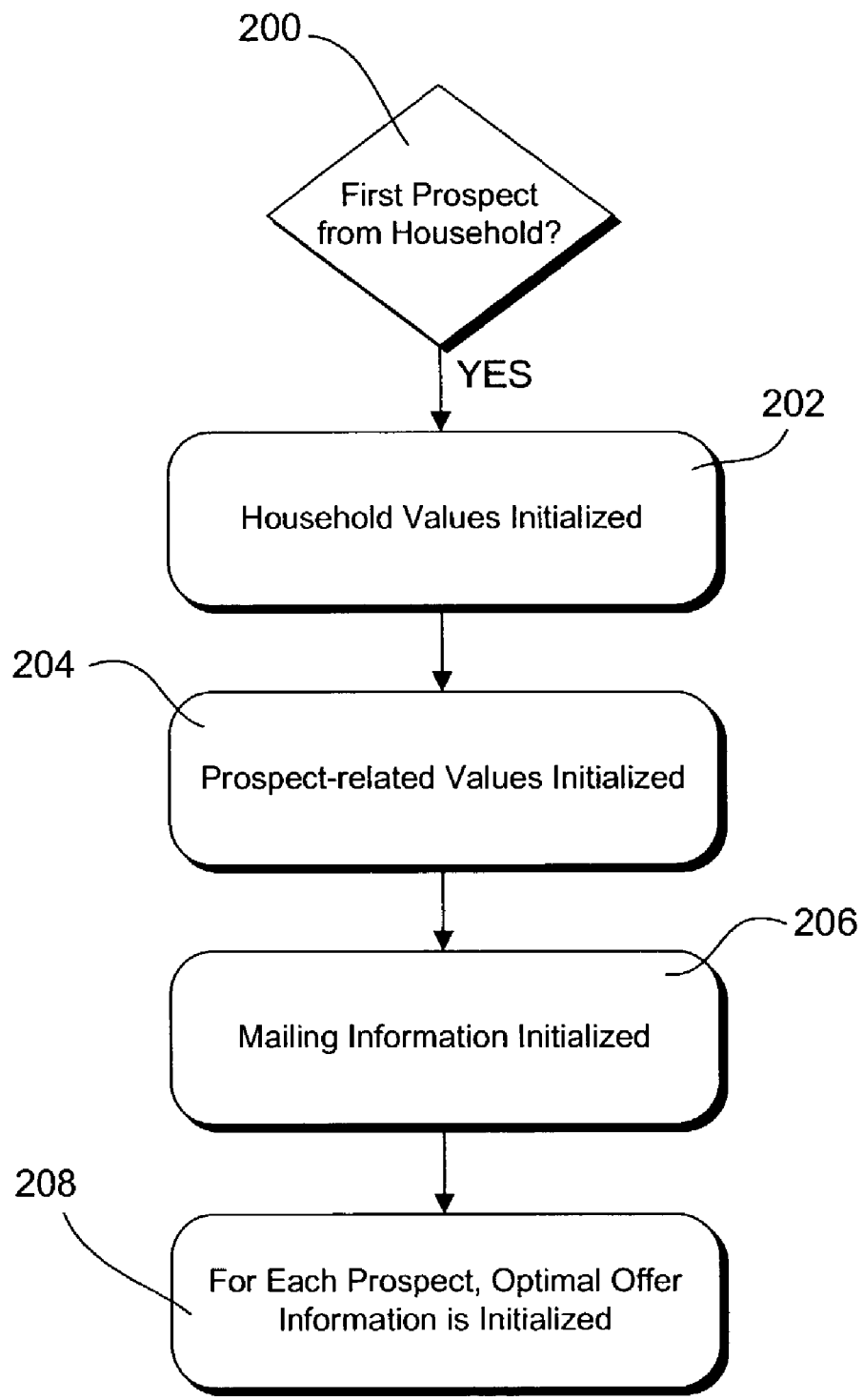
FIG. 2 is a flow diagram illustrating one embodiment of a method for initializing the above-described process when analyzing a first prospect in a household.

Referring now to FIG. 2, there is shown a flow diagram illustrating one embodiment of a method for initializing the above-described process when analyzing a first prospect in a household. Initially, at step 200, it may be determined whether a prospect under review is the first prospect from a household to be reviewed. If so, household values may be initialized at step 202. More particularly, in one embodiment, both a per-mailing record of offers sent to the household and a counter for the offers sent to the household may be set to zero. Next, at step 204, prospect-related values may be initialized. In one embodiment, prospect-specific arrays relating to various elements of offer information are initiated and a per-mailing record of offers sent to the prospect may be set to zero. Similarly, a counter for the offers sent to the prospect may also be set to zero.

At step 206, mailing information may be initialized, signifying that no offers have currently been assigned to the prospect. In one embodiment, the initialization of the mailing information includes setting an array of mailing counters related to mailing number, price point (NS_ID), and partner (NS_NAME) equal to zero. Next, at step 208, for each prospect, optimal offer information may be initialized to clear out any previously determined optimal offer information.

The extract of computer code in Table 2 exemplifies the above-described initialization process and has been written in the SAS Version 8 computer language. As above, it should be understood that the techniques applied herein are merely exemplary and may be embodied in different manners utilizing any desired computer programming language.

Figure 3:
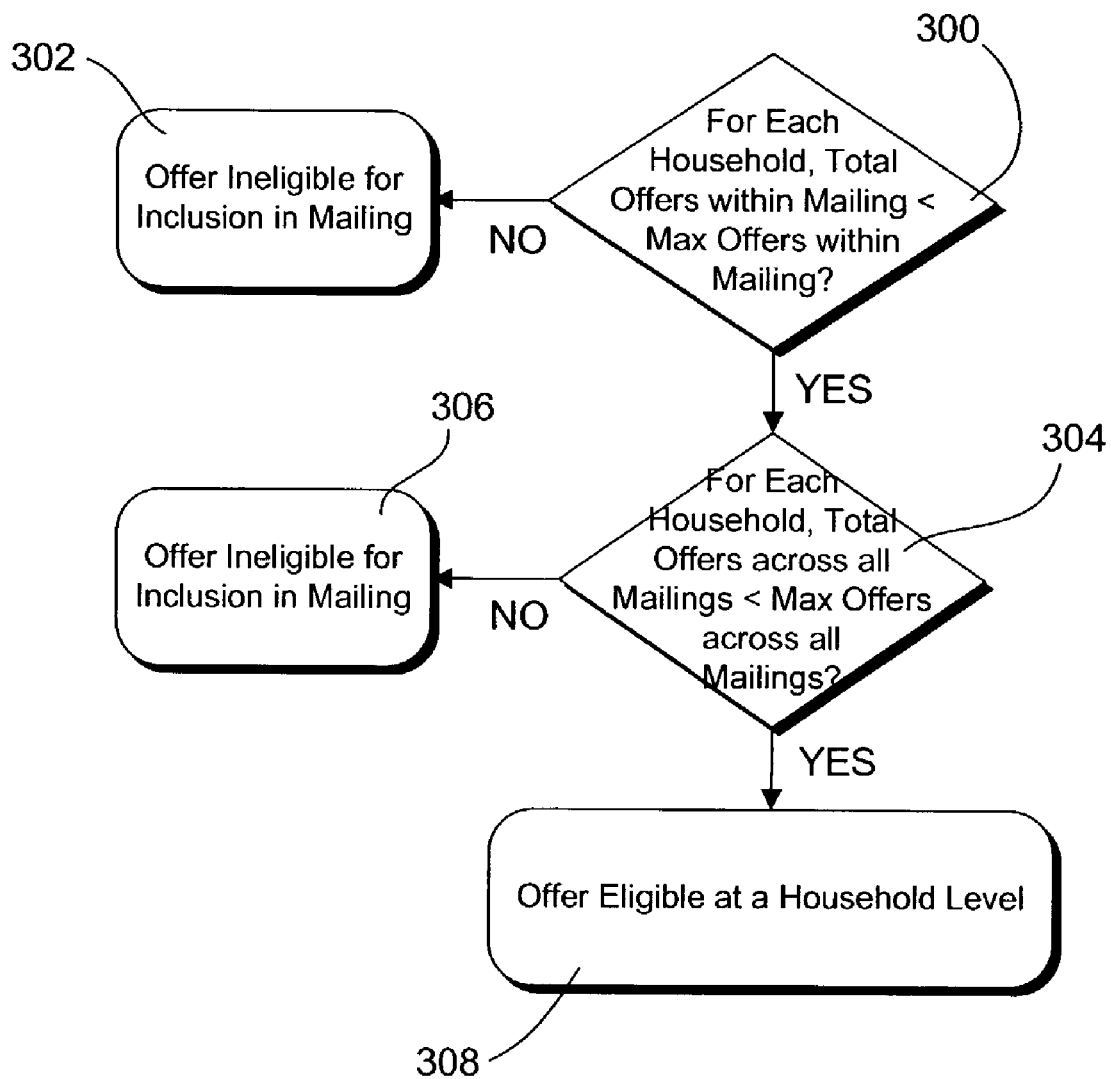
FIG. 3 is a flow diagram illustrating one embodiment of a method for a determining the household-level eligibility of a particular offer.

Referring now to FIG. 3, there is shown a flow diagram illustrating one embodiment of a method for determining the household-level eligibility of a particular offer as briefly described at step 102 above. At step 300, for each household in the mailing campaign, it may be determined whether the total number of selected offers for a household within a particular mailing are fewer than a predetermined maximum number of allowable offers. In one embodiment, the maximum number of allowable offers for a household within a particular mailing may be 12. If not, the offer may be ineligible for inclusion in the offer to the given household for the given mailing at step 302. However, if the total number of selected offers for the household within the mailing is less than the maximum number of allowable offers, the process may proceeds to step 304. At step 304, it is determined whether the total number of selected offers for a household, across all of the mailings in the campaign, is less than a maximum number of allowable offers across all mailings for the household. In one embodiment, the maximum number of allowable offers for a household across all mailings may be 72. If not, the offer may be ineligible for inclusion in the offer to the given household for the given mailing at step 306. However, if the total number of selected offers for the given household, across all of the mailings in the campaign, is less than the maximum number of allowable offers across all mailings for the household, the offer may be deemed eligible for inclusion at the household-level at step 308. It should be appreciated that other predetermined eligibility criteria on a household level may also be applied. For example, rather than the total number of offers in a mailing campaign, the following could be used in addition or instead: number of people in a household, estimated household income and previous accounts or responses, etc.

Figure 4:
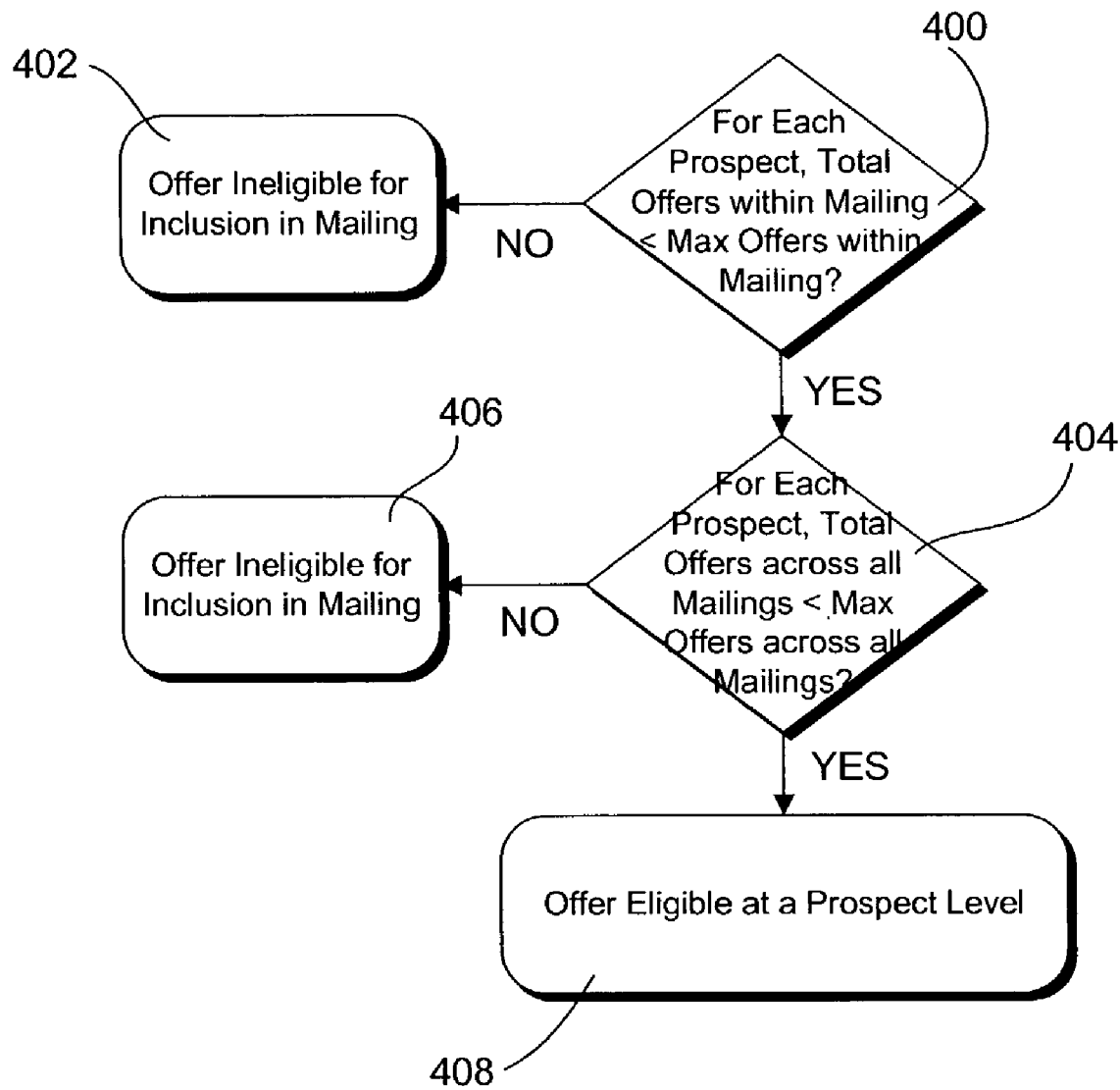
FIG. 4 is a flow diagram illustrating one embodiment of a method for a determining the prospect-level eligibility of a particular offer.

Referring now to FIG. 4, there is shown a flow diagram illustrating one embodiment of a method for determining the prospect-level eligibility of a particular offer as briefly described at step 102 above. At step 400, for each prospect in the mailing campaign, it may be determined whether a total number of selected offers for a prospect within a particular mailing is less than a predetermined maximum number of allowable offers. In one embodiment, the maximum number of allowable offers for a prospect within a particular mailing may be 6. If not, the offer may be rendered ineligible for inclusion in the offer to the given prospect for the given mailing at step 402. However, if the total number of selected offers for the prospect within the mailing is less than the maximum number of allowable offers, the process may proceed to step 404. At step 404, it may be determined whether the total number of selected offers for the prospect, across all of the mailings in the campaign, is less than a maximum number of allowable offers across all mailings for the household. In one embodiment, the maximum number of allowable offers for a prospect across all mailings is 42. If not, the offer may be ineligible for inclusion in the offer to the given household for the given mailing at step 406. However, if the total number of selected offers for the given prospect, across all of the mailings in the campaign is less than the maximum number of allowable offers across all mailings for the prospect, the offer may be deemed eligible for inclusion at the prospect-level in step 408. It should be appreciated that other predetermined eligibility criteria on a prospect level may also be applied. For example, the prospect's age, education level, income profile and past responses to mailing campaigns or the lack thereof could be considered in a prospect-level decision.

Figure 5:
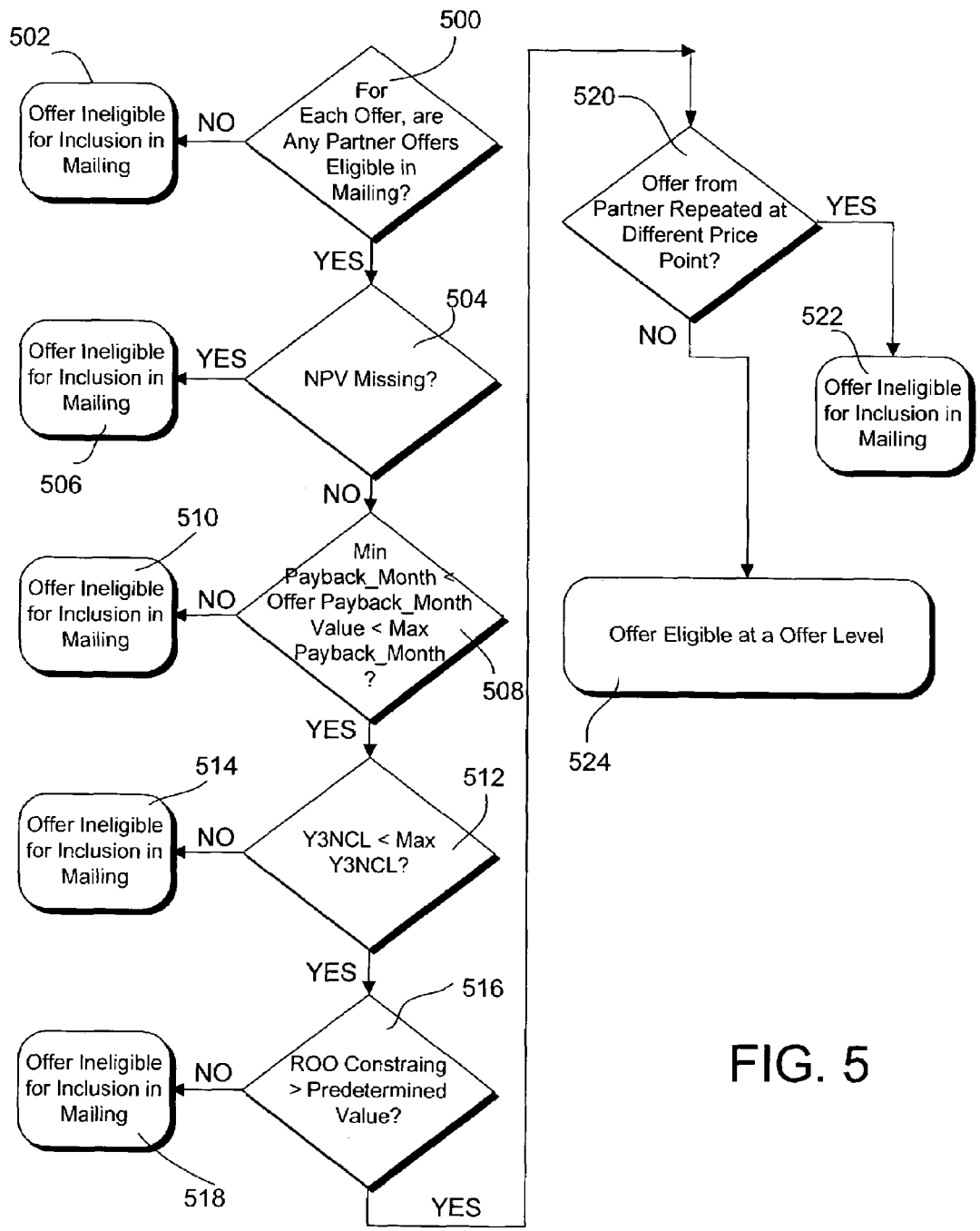
FIG. 5 is a flow diagram illustrating one embodiment of a method for a determining the offer-level eligibility of a particular offer.

Referring now to FIG. 5, there is shown a flow diagram illustrating one embodiment of a method for determining the offer-level eligibility of a particular offer as briefly described at step 102 above. At step 500, for each offer (i.e., partner-price point combination), it may be initially determined whether any offers from the partner (e.g. NS_NAME) are eligible in the particular mailing. If not, the offer may be deemed ineligible at step 502. If so, it may be next determined at step 504 whether the offer NPV is missing (i.e., whether the prospect is assigned the offer). If so, the offer may be deemed ineligible at step 506. However, if the NPV is not missing, it may be next determined in step 508 whether the offer has a payback_month value less than a predetermined maximum. The payback_month value for an offer is indicative of the number of months required before the offer becomes profitable. In one embodiment, the maximum acceptable payback_month value may be 36.

If the payback_month value is outside of the identified range, the offer may be deemed ineligible for inclusion at step 510. Next, at step 512, it may be determined whether the Y3NCL value for the offer is less than a predetermined maximum value. An offer's Y3NCL value relates to the perceived loss rate expected for the offer. In one embodiment, an eligible Y3NCL rate must be less than 6.5%. If the Y3NCL rate is 6.5% or greater of a given offer, the offer may be deemed ineligible for inclusion at step 514. However, if the offer's Y3NCL rate is less than the predetermined maximum, it may be next determined at step 516 whether the offer's expected return on outstanding (ROO) is greater than a predetermined value. In one embodiment the ROO constraints minimum limit may be zero. Additionally, an offer's ROO Sensitivity constraint may be calculated as: Y3ROO−ROOfactor−Y3NCL*NCLfactor>0. This ROO Sensitivity constraint requires that the third year return on outstanding of an offer must be above the sum of two quantities: (1) a minimum threshold specified by the value ROOfactor, and (2) a certain fraction of the perceived losses Y3NCL, specified by the value NCLfactor. If the offer's ROO Sensitivity constraint is violated, then the offer cannot generate sufficient return and the offer may be deemed ineligible for inclusion at step 518. Next, at step 520, it may be determined whether any other offers from the same partner have been repeated in the same mailing at a different price point. If so, the offer may be deemed ineligible at step 522. However, if it is determined that no other offers from the same partner have been repeated in the same mailing at a different price point, the offer may be deemed eligible for inclusion at the offer-level at step 524.

The extract of computer code in Table 3 exemplifies the above-described eligibility determinations and has been written in the SAS Version 8 computer language. As above, it should be understood that the techniques applied herein are merely exemplary and may be embodied in different manners utilizing any desired computer programming language.

Figure 6:
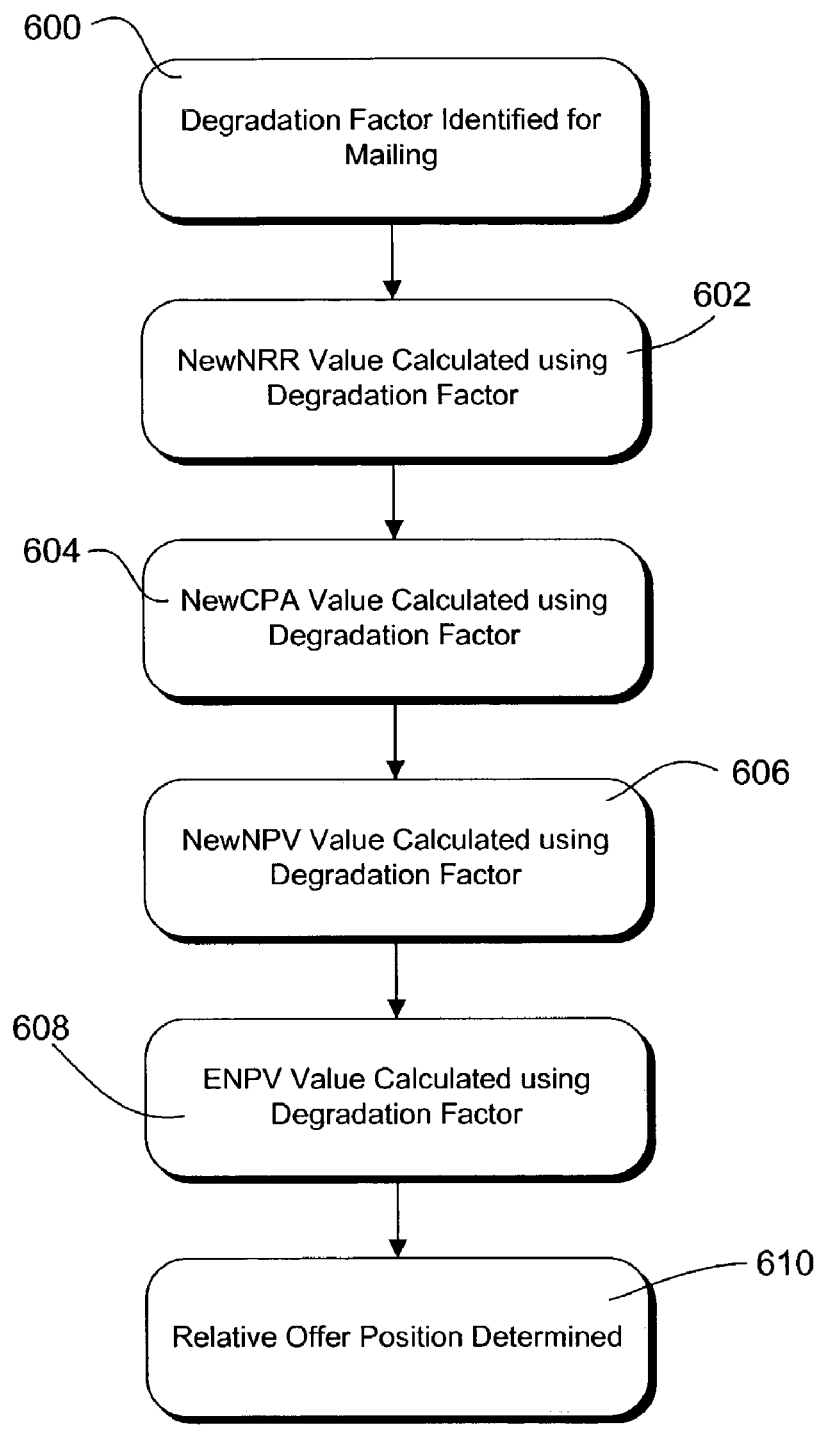
FIG. 6 is a flow diagram illustrating one embodiment of a method for calculating an offer's estimated NPV and estimated NRR including time degradation.

For offers meeting the eligibility requirements at each of the household, prospect, and offer-levels, expected NPV's and NRR's may be calculated as set forth at steps 104 and 106, above. Referring now to FIG. 6, there is shown a flow diagram illustrating one embodiment of a method for calculating an offer's estimated NPV and estimated NRR including time degradation in accordance with the present invention. Initially, once an offer is deemed eligible for inclusion in a particular mailing to a particular household or prospect, the degradation factor may be identified for the given mailing at step 600. In one embodiment of the present invention, each mailing in a campaign has an associated degradation factor representative of the decreased likelihood of response an offer undergoes in subsequent mailings. In an embodiment, the degradation factors for a campaign with 6 mailings may be 1.0, 0.9, 0.8, 0.7, 0.6, and 0.5. Utilizing the identified degradation factor, a NewNRR value representative of the offer's degraded response rate may be calculated at step 602. In one embodiment, NewNRR may be calculated as the degradation factor multiplied by the offer's initially expected response rate (NRR). Similarly, at step 604, a NewCPA value may be calculated representative of the offer's new CPA. In one embodiment, NewCPA may be calculated as the offer's initially expected CPA value divided by the degradation factor.

Next, at step 606, a NewNPV value may be calculated representing the offer's degraded net present value. In one embodiment, an offer's NewNPV may be calculated according to the following expression: NPV+(1−(1/DeGraFactor))×(1−TaxRate)×(CPA), where TaxRate represents a predetermined tax rate to be applied to each offer calculation and DeGraFactor represents a time-degradation factor. Once the NewNPV and NewNRR values have been calculated, an ENPV or expected NPV value may be calculated as (NewNPV×NewNRR) at step 608.

Once the degraded and estimated values for an offer have been determined, the position of the offer relative to other offers may be determined at step 610. More particularly, the expected NPV (or NRR, if selected for sorting) is compared against the existing maximum value. If the expected NPV (or NRR) is greater than the existing maximum expected NPV (or NRR) and the offer exceeds a predetermined hurdle rate, the current offer may be identified as the offer having the highest expected of profitability (or responsiveness). According to one embodiment of the present invention, the marketing offers may be sorted or ranked based on the calculated values of their NPVs and NRRs, as discussed previously in connection with step 108 of FIG. 1.

The extract of computer code in Table 4 exemplifies the above-described ENPV and NewNRR determinations and has been written in the SAS Version 8 computer language. As above, it should be understood that the techniques applied herein are merely exemplary and may be embodied in different manners utilizing any desired computer programming language.

Figure 7:
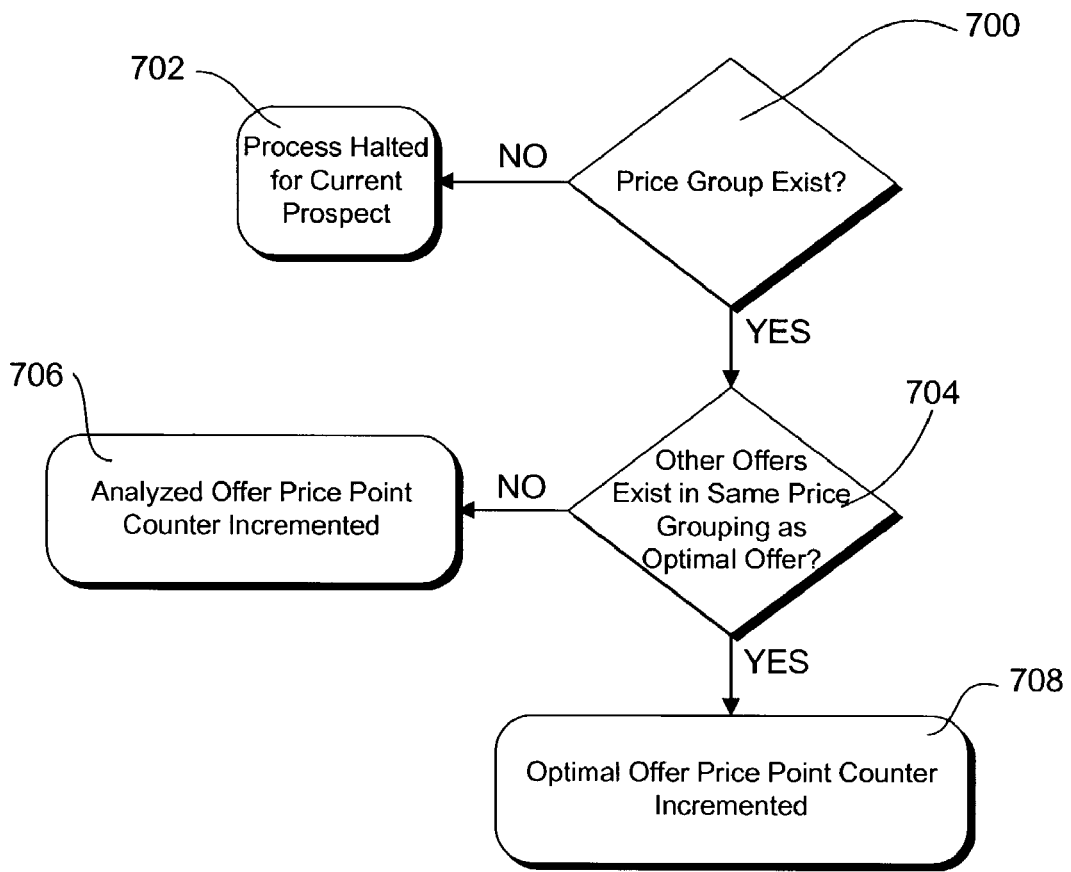
FIG. 7 is a flow diagram illustrating one embodiment of a method for updating eligibility criteria.

Once the optimal offer for a given prospect and mailing is identified, the various eligibility criteria may be updated to reflect this offer and its impact on the content of potential offers included in subsequent mailings. Referring now to FIG. 7, there is shown a flow diagram illustrating one embodiment of a method for updating the eligibility criteria in accordance with the present invention. Initially, at step 700, for the partner whose offer has been calculated as the optimal offer (selectedPtnr), it is determined whether a particular price grouping exists for that partner. If not, the process for the given prospect is halted at step 702. Otherwise, at step 704, it is next determined whether any other offers from the partner exist in the same price grouping as that of the optimal offer (selectedPrcp). If so, the counter related to the analyzed price point may be incremented at step 706. Otherwise, the counter related to the price point of the optimal offer may be incremented at step 708. By incrementing the counter to reflect the optimal offer for a prospect, offers potentially included in future mailings to the prospect may be properly restricted in accordance with the above-described eligibility requirements.

The extract of computer code in Table 5 exemplifies the above-described eligibility criteria updating process and has been written in the SAS Version 8 computer language. As above, it should be understood that the techniques applied below are merely exemplary and may be embodied in different manners utilizing any desired computer programming language.

By providing a dynamically adaptive system for determining optimal offers for mass mailing campaigns, based upon time-degraded data and eligibility requirements, the present invention substantially increases the efficiency and effectiveness of such campaigns. By systematically analyzing each prospect and household included within a campaign for each available offer, the best available offer is identified. In addition, by including degradation factors into the analysis, the accuracy of the identification is also improved.

Figure 8:
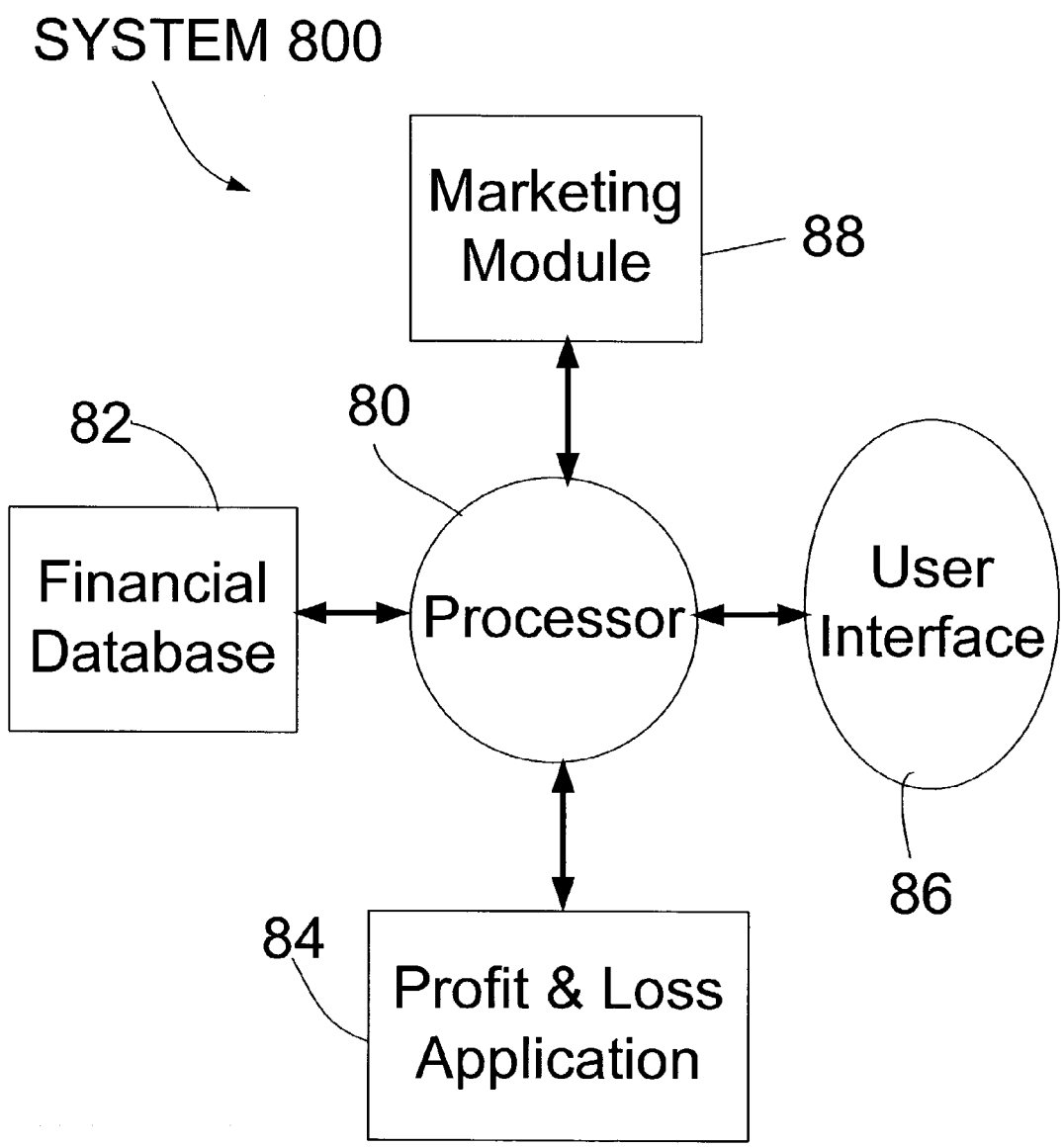
FIG. 8 is a block diagram of a system for identifying optimal marketing offers according to an exemplary embodiment of the present invention.

FIG. 8 is a schematic representation of a system ("System 800") for identifying optimal marketing offers, according to an exemplary embodiment of the present invention. The system comprises Processor 80, Financial Database 82, Profit & Loss Application 84, User Interface 86 and Marketing Module 88. According to an embodiment of the invention, System 800 may be implemented on computer(s) or a computer-based network. Processor 80 may be a central processing unit (CPU) or a computer capable of data manipulation, logic operation and mathematical calculation. According to an embodiment of the invention, Processor 80 may be a standard computer comprising an input device, an output device, a processor device, and a data storage device. Financial Database 82 may be one or more databases including at least the information associated with marketing offers, customer profiles and/or business partnerships. Profit & Loss Application 84 may be a software application for evaluating prospect-level profit and loss associated with the marketing offers and potential customers. User Interface 86 may be a graphical user interface (GUI) serving the purpose of obtaining inputs from and presenting results to a user of the system. According to embodiments of the invention, the User Interface module may be a display, such as a CRT (cathode ray tube), LCD (liquid crystal display) or touch-screen monitor, or a computer terminal, or a personal computer connected to Processor 80. Marketing Module 88 may be an automated or human-operated module capable of communicating marketing offers to potential customers.

By way of example, the operation of System 800 for identifying optimal marketing offers will now be described, according to one embodiment of the present invention. A user of the system may enter a request for offer optimization through User Interface 86. Upon receiving the request, Processor 80 may collect offer-related information by taking input data from the user, by communicating with Financial Database 82, or by taking the output of Profit & Loss Application 84. Then Processor 80 may analyze the information and apply a plurality of predetermined criteria to evaluate eligibility of each marketing offer for inclusion in a mailing campaign. The evaluation may be done on a household level, a prospect level and an offer level for each potential marketing offer, as discussed previously. For every eligible marketing offer identified, a net present value (NPV) and a net response rate (NRR) may be calculated. The eligible marketing offers may be sorted or ranked based on the calculated values of their NPVs and NRRs. Subsequently one or more optimal marketing offers may be identified and reported to the user through User Interface 86. Or Marketing Module 88 may send out marketing offers based on the optimization results. Next the offer-related information in Financial Database 82 may be updated based on the optimization results, mailed marketing offers and subsequent responses. According to embodiments of the invention, instead of being triggered by user inputs, System 800 may be programmed to operate automatically and/or on a regular basis. Marketing offers may be sent and offer-related information may be updated without much intervention from a user.

At this point, it should be appreciated that the system and method for identifying optimal marketing offers, as described herein, is not limited to making offers by mail. Optimal marketing offers may also be communicated to potential customers, i.e. prospects or households, via other media. For example, the offers may be made through electronic mails, facsimile transmission, telephone solicitation, inbound calls or targeted advertisements. The offers may also be made in person by sales representatives. Other ways for communicating the optimal marketing offers also exist.

While the foregoing description includes many details and specificities, it is to be understood that these have been included for purposes of explanation only, and are not to be interpreted as limitations of the present invention. Many modifications to the embodiments described above can be made without departing from the spirit and scope of the invention, as is intended to be encompassed by the following claims and their legal equivalents.

TABLE 1

```
/****  PARAMETERS  ****/
%let MaxObj = 1;         /* 1 = Max Expected NPV 2 = Max
                            Responders, this is user-selectable */
%let TaxRate = 0.35;      /* used in NPV calculation */
%let HurdleRate = 0;      /* used in NPV/CPA constraint */
%let NCLUpperLimit = 0.01; /* used in NCL constraint */
%let RooFactor = 0.01;    /* used in ROO constraint */
%let NCLFactor = 0.01;    /* used in ROO constraint */
%let MaxPaybackMonth = 100;  /* used in Payback_Month constraint */
%let MaxMail = 6;         /* maximum number of mailings */
%let MaxPtnr = 52;        /* maximum number of partners */
%let MaxPrcp = 15;        /* maximum number of price points */
%let MaxPrcpPtnr = %eval(&MaxPrcp. * &MaxPtnr.);
%let MaxPrsptOffrWk1 = 2; /* maximum number of mailings for each
prospect in week 1*/
%let MaxPrsptOffrWk2 = 2; /* maximum number of mailings for each
prospect in week 2*/
%let MaxPrsptOffrWk3 = 2; /* maximum number of mailings for each
prospect in week 3*/
%let MaxPrsptOffrWk4 = 2; /* maximum number of mailings for each
prospect in week 4*/
%let MaxPrsptOffrWk5 = 2; /* maximum number of mailings for each
prospect in week 5*/
%let MaxPrsptOffrWk6 = 2; /* maximum number of mailings for each
prospect in week 6*/
%let MaxPrsptOffrWkA = 2; /* max(of &MaxPrsptOffrWk1.-
&MaxPrsptOffrWk6.)         */
%let MaxPrsptOffr  = 8; /* maximum number of offers for each prospect
throughout all mailings */
%let MaxPrspMail = %eval(&MaxPrsptOffrWkA. * &MaxMail.);/*
        maximum mails for each prospect in all mailings */
%let MaxHHOffrWk1 = 2; /* maximum number of mailings for each
household in week 1 */
%let MaxHHOffrWk2 = 2; /* maximum number of mailings for each
household in week 2 */
%let MaxHHOffrWk3 = 2; /* maximum number of mailings for each
household in week 3 */
%let MaxHHOffrWk4 = 2; /* maximum number of mailings for each
household in week 4 */
%let MaxHHOffrWk5 = 2; /* maximum number of mailings for each
household in week 5 */
%let MaxHHOffrWk6 = 2; /* maximum number of mailings for each
household in week 6 */
%let MaxHHOffr  = 8; /* maximum number of offers for each household
throughout all mailings*/
```

TABLE 1-continued

```
/****  End Parameters
****/
/****  MACROS  ****/
/*********** For Partner List *************/
%let MaxPtnrName = 40; /* maximum length of the partner name */
/* List all partners here. When indexing, put BRANDS first, then all the
others in alphabetic order. */
%macro ListPtnr;
'PARTNER A'
'PARTNER B'
'PARTNER C'
%mend;
/*********** For Price Points List *************/
%let MaxPrcpName = 40; /* maximum length of the price point name */
%macro GrpPtnrFlag; /* flag indicating whether to group price for the
partner (MaxPtnr flags) */
  %do i = 1 %to &MaxPtnr.;
    1
  %end;
%mend;

/* price points listed here */
%macro ListPrcp;
'PRICEPOINT 1'
'PRICEPOINT 2'
'PRICEPOINT 3'
%mend;
%macro PtnrPrcpGrpList; /* establishes partner price grouping list */
%local i;
%local j;
%do i = 1 %to &MaxPtnr;
  %if &i = 15 %then %do; /* for brand (related) partners */
      1 1 1 1 0 0 0 0 0 0 0 0 1 1 1
      1 1 1 1 0 0 0 0 0 0 0 0 1 1 1
      1 1 1 1 0 0 0 0 0 0 0 0 1 1 1
      1 1 1 1 0 0 0 0 0 0 0 0 1 1 1
      0 0 0 0 1 1 1 1 0 0 0 0 0 0 0
      0 0 0 0 1 1 1 1 0 0 0 0 0 0 0
      0 0 0 0 1 1 1 1 0 0 0 0 0 0 0
      0 0 0 0 1 1 1 1 0 0 0 0 0 0 0
      0 0 0 0 0 0 0 0 1 1 1 1 0 0 0
      0 0 0 0 0 0 0 0 1 1 1 1 0 0 0
      0 0 0 0 0 0 0 0 1 1 1 1 0 0 0
      0 0 0 0 0 0 0 0 1 1 1 1 0 0 0
      1 1 1 1 0 0 0 0 0 0 0 0 1 1 1
      1 1 1 1 0 0 0 0 0 0 0 0 1 1 1
      1 1 1 1 0 0 0 0 0 0 0 0 1 1 1
  %end;
  %else %do; /* for other partners */
    %do j = 1 %to &MaxPrcp.;
        1 1 1 1 1 1 1 1 1 1 1 1 1 1 1
    %end;
  %end;
%end;
%mend;
%macro ListVar(nn); /* List of variables */
  &nn.1-&nn.&&MaxPrcpPtnr.
%mend;
%macro ListWeek(nn);
  %local i;
  %do i = 1 %to &MaxMail;
    &&&nn.&i
  %end;
%mend;
%macro ListDeGraFactor; /* Total six factors for six week mailing */
  1 0.9 0.8 0.7 0.6 0.5    /* only the first three factors will be used in the
code */
%mend;
%macro ListPtnrFlag; /* Partner weekly eligibility */
  0 1 0 1 0 0
  0 1 0 1 0 0
  0 1 0 1 0 0
%mend;
/****  end macros  ****/
```

TABLE 2

```
/*********** First Prospect in a household ***********/
if first.HH_ID then do; /* initialize retained household variables */
  do i = 1 to &MaxMail.;
    ZHHOffr(i) = 0;
  end;
  sumHHOffr = 0;
end; /*end initializing retained household variables*/
do i = 1 to &MaxMail; /* initialize prospect mail selection output */
  do j = 1 to &MaxPrsptOffrWkA.;
    ZMailPrcp(i,j) = 0;
    ZMailPtnr(i,j) = 0;
    ZMailENPV(i,j) = .;
    ZMailNPV(i,j) = .;
    ZMailNRR(i,j) = .;
    ZMailRR(i,j) = .;
    ZMailNCL(i,j) = .;
    ZMailROO(i,j) = .;
    ZMailCPA(i,j) = .;
    ZMailHCPA(i,j) = .;
  end;
  ZPrsptOffr(i)= 0;
end;
do i = 1 to &MaxPrcp; /* reset prospect counter for given prospect to 0 */
  do j = 1 to &MaxPtnr;
    Counter(i,j) = 0;
  end;
end;
sumPrsptOffr = 0; /* set total offer counter for each prospect to zero */
/********* at mailing T *********/
do T = 1 to &MaxMail.;
do i = 1 to &MaxPrcp.;
  do j = 1 to &MaxPtnr;
    CounterInWk(i,j) = 0;
  end;
end;
/* maximum offer per prospect */
do m = 1 to ZMaxPrspt(T);
        NewNRR = .;
        NewCPA = .;
        NewNPV = .;
        ENPV = 0;
maxENPV = 0;
        Target = 0;
        maxTarget = 0;
  maxNPV = .;
maxNRR = .;
maxRR = .;
maxNCL = .;
maxROO = .;
maxCPA = .;
maxHCPA = .;
maxNSID = .;
eligflag = 0;
selectedPrcp = 0;
selectedPtnr = 0;
```

TABLE 3

```
/* for all price points */
do i = 1 to &MaxPrcp; /* &MaxPrcp refers to the maximum pricepoint number */
  /* for all partners */
  do j = 1 to &MaxPtnr.;
  /* if partner is available, the prospect is eligible and not at maxOffr */
    ifZPtnrFlag(j,T) = 1       and /* ZptnrFlag is an array representing
                                      partner inclusion
                                      in each mailing, 1 for included, 0 for
                                      excluded */
    Znpv(i,j)    ~=.           and /* Znpv is an array of offer npv's */
    Zncl(i,j)    ~=.           and /* Zncl is an array of offer ncl's for
                                      each pricepoint and mailing*/
    Zroo(i,j)    ~=.           and /* Zroo is an array of offer for each
                                      pricepoint and mailing */
    Zpbp(i,j)    ge 0          and /* Zpbp is an array of offer for
                                      each pricepoint and mailing */
```

TABLE 3-continued

```
    sumPrsptOffr  <&MaxPrsptOffr.   and /* total prospect offers must
                                          be less than a max number of prospect
                                          offers */
    sumHHOffr     <&MaxHHOffr.      and /* total household offers
                                          must be less than a max number of
                                          household offers */
    ZPrsptOffr(T) <ZMaxPrspt(T)     and /* prospect offers in mailing
                                          must be less than a max number of
                                          prospect offers in the mailing */
    ZHHOffr(T)    <ZMaxHH(T)        and /* household offers in
                                          mailing must be less than a max number
                                          of household offers in the mailing */
    Zcpa(i,j)     > 0                   /* Zcpa is an array of offer CPA's */
    then do;
      eligflag = 1;   /* this sets the eligibility flag to 1 if all constraints met */
      if CounterInWk(i,j) > 0 then eligflag = 0;   /* if same offer has been sent in the same week */
      if Zncl(i,j) >= &NCLUpperLimit. then eligflag =0; /* ncl constraint */
      if Zpbp(i,j) > &MaxPaybackMonth. then eligflag = 0; /* payback_month constraint */
      if( Zroo(i,j) - &RooFactor. ) - &NCLFactor. * Zncl(i,j) < 0 then eligflag 0; /* roo constraint */
```

TABLE 4

```
      if eligflag = 1 then do; /* calculate estimated NPV, with degradation */
                DeGraFactor = 1;
                DeGraFactor =
ZDeGraFactor(Counter(i,j)+1);
                NewNRR = DeGraFactor * Znrr(ij); /* calculate NewNRR */
                NewCPA = Zcpa(i,j) / DeGraFactor;   /* calculate NewCPA */
                NewNPV = Znpv(i,j) + (1-1/DeGraFactor)*(1-&TaxRate.)*Zcpa(i,j);/* calculate NewNPV */
                ENPV = NewNRR * NewNPV; /* calculate estimated NPV */
                if &MaxObj. = 1 then Target = ENPV; /* look for MAX expected response rate */
                    else       Target = NewNRR; /* look for MAX total responders */
                /*compare with current maximum ENPV */
                if (Target >maxTarget) and (NewNPV > &HurdleRate. * NewCPA) then do;
                  /* update selected price point, partner, maxENPV and others*/
                  selectedPrcp = i;
                  selectedPtnr = j;
                  maxTarget  = Target;
                  maxENPV    = ENPV;
                  maxNPV     = Znpv(i,j);
                  maxNRR     = NewNRR;
                  maxRR      = Znrr(ij);
                  maxNCL     = Zncl(i,j);
                  maxROO     = Zroo(i,j);
                  maxCPA     = Zcpa(i,j);
                  maxHCPA    = NewCPA;
                  maxNSID    = Znsid(i,j);
                end; /* offer selection */
             end; /* expected NPV calculation */
          end; /* availability, eligibility, max Offer */
        end; /* partner j */
      end; /* price point i */
/* -------------------------------------------------- */
  Assign optimal offer
/* -------------------------------------------------- */
      if selectedPrcp > 0 then do;
        ZMailPrcp(T,m) = selectedPrcp; /* update pricepoint for offer mailed to prospect m for mailing T */
        ZMailPtnr(T,m) = selectedPtnr; /* update partner for offer mailed to prospect m for mailing T */
        ZMailENPV(T,m) = maxENPV;      /* update ENPV for offer mailed to prospect m for mailing T */
```

TABLE 4-continued

```
        ZMailNPV(T,m) = maxNPV;      /* update NPV for offer mailed
to prospect m for mailing T */
        ZMailNRR(T,m) = maxNRR;      /* update NRR for offer mailed
to prospect m for mailing T */
        ZMailRR(T,m) = maxRR;        /* update RR for offer mailed to
prospect m for mailing T */
        ZMailNCL(T,m) = maxNCL;      /* update NCL for offer mailed to
prospect m for mailing T */
        ZMailROO(T,m) = maxROO;      /* update ROO for offer mailed to
prospect m for mailing T */
        ZMailCPA(T,m) = maxCPA;      /* update CPA for offer mailed to
prospect m for mailing T */
        ZMailHCPA(T,m) = maxHCPA;    /* update HCPA for offer
mailed to prospect m for mailing T */
        ZMailNSID(T,m) = maxNSID;    /* update NSID for offer mailed
to prospect m for mailing T */
        sumPrsptOffr + 1;            /* increment the prospect offers counter by
1 */
        sumHHOffr + 1;               /* increment the household offers counter
by 1 */
        ZPrsptOffr(T) + 1;           /* increment the prospect offers for
mailing T counter by 1 */
        ZHHOffr(T) + 1;              /* increment the household offers for
mailing T counter by 1 */
```

TABLE 5

```
/* ----------------------------------------------------------------- */
   Update eligibility indicators based on assigned optimal offer
/* ----------------------------------------------------------------- */
    do u = 1 to &MaxPrcp.; /* one partner one offer per week, therefore
       all price point flags set to avoid inclusion of other offers from same
       partner */;
        CounterInWk(u, selectedPtnr) + 1;
    end;
    * if there is price grouping for the selected partner;
    if ZPtnrGrpFlag(selectedPtnr) = 1 then do;
       do v = 1 to &MaxPrcp.;
          if ZPriceGrpFlag(selectedPtnr, selectedPrcp, v) > 0 /* if
             in the same price group */
             then counter(v, selectedPtnr) + 1;
          end;
       end;
       else counter(selectedPrcp, selectedPtnr) + 1;
    end;
    else m = 100; * stop the m loop;
end; /* maximum offer per prospect */
end; /* mailing T */
```

What is claimed is:

1. A computer-implemented method for identifying optimal marketing offers using a computer processor, the method comprising:
   collecting and analyzing information associated with a plurality of potential marketing offers;
   identifying, with the computer processor, a plurality of marketing offers, from the plurality of potential marketing offers, that are eligible for inclusion in a marketing campaign, based on a plurality of predetermined criteria and the collected information, where the plurality of potential marketing offers are evaluated for eligibility on a household level, a prospect level and an offer level;
   calculating a measure of profitability and response rate for each of the identified eligible marketing offers, the measure of response rate for each of the eligible marketing offers comprising a net response rate (NRR) calculated based on an associated time-degradation factor; and
   identifying at least one optimal marketing offer from the eligible marketing offers based at least in part on the measure of profitability and response rate for each of the eligible marketing offers.

2. The method according to claim 1, where the information associated with the plurality of potential marketing offers comprises at least one of the following factors associated with each of the plurality of potential marketing offers:
   a net present value;
   a net response rate;
   business partnership;
   price points;
   number of months before expected profitability;
   expected loss rate percentage; and
   third-year return on outstanding.

3. The method according to claim 1, where the measure of profitability for each of the eligible marketing offers comprises a net present value (NPV) calculated based on an associated time-degradation factor.

4. The method according to claim 3, further comprising identifying an associated time degradation factor for each of the eligible marketing offers.

5. The method according to claim 1, further comprising identifying an associated time degradation factor for each of the eligible marketing offers.

6. The method according to claim 1, further comprising ranking the plurality of eligible marketing offers based at least in part on the measure of profitability or response rate for each of the eligible marketing offers.

7. The method according to claim 1, further comprising communicating marketing offers based on the at least one optimal marketing offer.

8. The method according to claim 1, further comprising
   updating the information associated with the plurality of potential marketing offers;
   updating the plurality of predetermined criteria; and
   re-identifying optimal marketing offers based on the updated information and criteria.

9. A computer readable medium having code for causing a processor to identify optimal marketing offers, the computer readable medium comprising:
   code adapted to collect and analyze information associated with a plurality of potential marketing offers;
   code adapted to identify a plurality of marketing offers, from the plurality of potential marketing offers, that are eligible for inclusion in a marketing campaign, based on a plurality of predetermined criteria and the collected information, where the plurality of potential marketing offers are evaluated for eligibility on a household level, a prospect level and an offer level;
   code adapted to calculate a measure of profitability and response rate for each of the identified eligible marketing offers, where the measure of response rate for each of the eligible marketing offers comprises a net response rate (NRR) calculated based on an associated time degradation factor; and
   code adapted to identify at least one optimal marketing offer from the eligible marketing offers based at least in part on the measure of profitability and response rate for each of the eligible marketing offers.

10. The computer readable medium according to claim 9, where the information associated with the plurality of potential marketing offers comprises at least one of the following factors associated with each of the plurality of potential marketing offers:
    a net present value;
    a net response rate;

business partnership;
price points;
number of months before expected profitability;
expected loss rate percentage; and
third-year return on outstanding.

11. The computer readable medium according to claim 9, where the measure of profitability for each of the eligible marketing offers comprises a net present value (NPV) calculated based on an associated time-degradation factor.

12. The computer readable medium according to claim 11, further comprising code adapted to identify an associated time-degradation factor for each of the eligible marketing offers.

13. The computer readable medium according to claim 9, further comprising code adapted to identify an associated time-degradation factor for each of the eligible marketing offers.

14. The computer readable medium according to claim 9, further comprising code adapted to rank the plurality of eligible marketing offers based at least in part on the measure of profitability or response rate for each of the eligible marketing offers.

15. The computer readable medium according to claim 9, further comprising code adapted to communicate marketing offers based on the at least one optimal marketing offer.

16. The computer readable medium according to claim 9, further comprising
code adapted to update the information associated with the plurality of potential marketing offers;
code adapted to update the plurality of predetermined criteria; and
code adapted to re-identify optimal marketing offers based on the updated information and criteria.

17. A system for identifying optimal marketing offers, the system comprising:
a processor;
a computer readable medium storing:
a data analysis module configured to collect and analyze information associated with a plurality of potential marketing offers;
an identification module configured to identify a plurality of marketing offers, from the plurality of potential marketing offers, that are eligible for inclusion in a marketing campaign, based on a plurality of predetermined criteria and the collected information, where the plurality of potential marketing offers are evaluated for eligibility on a household level, a prospect level and an offer level;
a calculation module configured to calculate a measure of profitability and response rate for each of the identified eligible marketing offers, where the measure of response rate for each of the eligible marketing offers comprises a net response rate (NRR) calculated based on an associated time-degradation factor; and
an optimization module configured to identify at least one optimal marketing offer from the eligible marketing offers based at least in part on the measure of profitability and response rate for each of the eligible marketing offers.

18. The system according to claim 17, where the information associated with the plurality of potential marketing offers comprises at least one of the following factors associated with each of the plurality of potential marketing offers:
a net present value;
a net response rate;
business partnership;
price points;
number of months before expected profitability;
expected loss rate percentage; and
third-year return on outstanding.

19. The system according to claim 17, where the measure of profitability for each of the eligible marketing offers comprises a net present value (NPV) calculated based on an associated time-degradation factor.

20. The system according to claim 19, further comprising an identification module configured to identify an associated time-degradation factor for each of the eligible marketing offers.

21. The system according to claim 17, further comprising an identification module configured to identify an associated time-degradation factor for each of the eligible marketing offers.

22. The system according to claim 17, further comprising a ranking module configured to rank the plurality of eligible marketing offers based at least in part on the measure of profitability or response rate for each of the eligible marketing offers.

23. The system according to claim 17, further comprising a marketing module configured to communicate marketing offers based on the at least one optimal marketing offer.

24. The system according to claim 17, further comprising
a first updating module configured to update the information associated with the plurality of potential marketing offers;
a second updating module configured to update the plurality of predetermined criteria; and
an optimization module configured to re-identify optimal marketing offers based on the updated information and criteria.

25. A system for identifying optimal marketing offers, the system comprising:
means for collecting and analyzing information associated with a plurality of potential marketing offers;
means for identifying a plurality of marketing offers, from the plurality of potential marketing offers, that are eligible for inclusion in a marketing campaign, based on a plurality of predetermined criteria and the collected information, where the plurality of potential marketing offers are evaluated for eligibility on a household level, a prospect level and an offer level;
means for calculating a measure of profitability and response rate for each of the identified eligible marketing offers, where the measure of response rate for each of the eligible marketing offers comprises a net response rate (NRR) calculated based on an associated time-degradation factor; and
means for identifying at least one optimal marketing offer from the eligible marketing offers based at least in part on the measure of profitability and response rate for each of the eligible marketing offers.

26. The system according to claim 25, where the information associated with the plurality of potential marketing offers comprises at least one of the following factors associated with each of the plurality of potential marketing offers:
a net present value;
a net response rate;
business partnership;
price points;
number of months before expected profitability;
expected loss rate percentage; and
third-year return on outstanding.

27. The system according to claim 25, where the measure of profitability for each of the eligible marketing offers comprises a net present value (NPV) calculated based on an associated time-degradation factor.

28. The system according to claim 27, further comprising means for identifying an associated time-degradation factor for each of the eligible marketing offers.

29. The system according to claim 25, further comprising means for identifying an associated time-degradation factor for each of the eligible marketing offers.

30. The system according to claim 25, further comprising means for ranking the plurality of eligible marketing offers based at least in part on the measure of profitability or response rate for each of the eligible marketing offers.

31. The system according to claim 25, further comprising means for communicating marketing offers based on the at least one optimal marketing offer.

32. The system according to claim 25, further comprising
means for updating the information associated with the plurality of potential marketing offers;
means for updating the plurality of predetermined criteria; and
means for re-identifying optimal marketing offers based on the updated information and criteria.

* * * * *

UNITED STATES PATENT AND TRADEMARK OFFICE
CERTIFICATE OF CORRECTION

PATENT NO. : 7,606,727 B1  Page 1 of 1
APPLICATION NO. : 10/461499
DATED : October 20, 2009
INVENTOR(S) : Pederson et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1870 days.

Signed and Sealed this

Twelfth Day of October, 2010

David J. Kappos
*Director of the United States Patent and Trademark Office*